(12) United States Patent
Bravo

(10) Patent No.: US 12,274,251 B1
(45) Date of Patent: Apr. 15, 2025

(54) ELECTRIC CLIP RECEIVER SYSTEM FOR OUTRIGGERS

(71) Applicant: Erick Bravo, Marathon, FL (US)

(72) Inventor: Erick Bravo, Marathon, FL (US)

( * ) Notice: Subject to any disclaimer, the term of this patent is extended or adjusted under 35 U.S.C. 154(b) by 0 days.

(21) Appl. No.: 19/007,444

(22) Filed: Dec. 31, 2024

(51) Int. Cl.
*A01K 91/08* (2006.01)

(52) U.S. Cl.
CPC .................................. *A01K 91/08* (2013.01)

(58) Field of Classification Search
CPC ...... A01K 91/053; A01K 91/08; A01K 91/10; A01K 89/0165
USPC .............................................. 43/4, 27.2, 27.4
See application file for complete search history.

(56) References Cited

U.S. PATENT DOCUMENTS

| | | | | |
|---|---|---|---|---|
| 4,610,409 A * | 9/1986 | Emory, Jr. | ............. | A01K 91/08 254/326 |
| 4,875,428 A * | 10/1989 | Schlesch | ................. | B63B 43/14 43/26.1 |
| 8,656,632 B1 * | 2/2014 | Mercier | ............... | A01K 91/053 43/43.12 |
| 11,259,513 B1 * | 3/2022 | Bravo | .................... | A01K 91/08 |

FOREIGN PATENT DOCUMENTS

WO WO-2008110650 A1 * 9/2008 ............. A01K 91/08

* cited by examiner

*Primary Examiner* — Peter M Poon
*Assistant Examiner* — Danielle A Clerkley
(74) *Attorney, Agent, or Firm* — Ruben Alcoba, Esq.

(57) ABSTRACT

An improved electric clip receiver system for outriggers designed for water vessels, enhancing the control and functionality of fishing lines during marine activities. The device includes an outrigger secured to the vessel, equipped with a mounting clamp and housing containing at least one electric stepper motor, stepper motor drivers, and a controller. At the housing's exterior, pulleys are connected to the motor drivers and integrated with line guides. Lines loop through midsection guides, far-end eyelets, and vessel-mounted rollers, forming closed circuit lines controlled by the motors. The system includes line clips at each end of the lines for securing fishing lines. The power source and control wire connect to the controller, enabling precise line adjustments. This innovative design enhances efficiency and ease of use, providing automated control for improved fishing performance and convenience in deploying and retrieving fishing lines.

2 Claims, 1 Drawing Sheet

ELECTRIC CLIP RECEIVER SYSTEM FOR OUTRIGGERS

TECHNICAL FIELD

The present invention pertains to an improved electric clip receiver system for outriggers that are used on fishing vessels. The improved electric clip receiver system allows a user to set a fishing line on an outrigger release clip using a minimal amount of force.

BACKGROUND

Outriggers are long poles deployed from the back or the sides of fishing vessels to widen the trolling area and accommodate multiple lines. Outriggers are normally used when trolling for fish.

Outriggers are long poles that may be fitted on both sides of a fishing vessel and that are designed to hold a fishing line. Outriggers allow a user to reel in and release his or her fishing line from an outrigger release clip via a system of pulleys and clips. Outriggers vary in lengths and normally they range from 12 to 35 feet.

Trolling is a fishing technique that involves dragging several fishing lines off the back or the sides of a boat as the boat moves through a body of water.

Outriggers are advantageous to fishermen because they minimize fishing lines from being tangled and they also increase the chances of the fishermen hooking the fish. The chances of hooking fish are increased because outriggers allow a fisherman to cover more water, outriggers keep bait out of whitewater, and they provide the fishermen a clear view of the fish.

The present invention is an improved electric clip receiver system for outriggers. The inventor owns a patent for an electric clip receiver for outriggers, U.S. patent Ser. No. 11/259,513 that was issued on Mar. 1, 2022, the patent used a different motor and was a single line electric clip receiver. The present invention has optimized the electric clip receiver for maritime conditions.

Presently, most outrigger require a fisherman to manually reel and release the fisherman's fishing line from the outrigger release clip using the manual force of the fisherman. The present invention provides an improved electronic device that allows the fisherman to reel and release the fisherman's fishing line from the outrigger release clip without the fisherman having to use manual force.

SUMMARY

The present invention is directed to an improved electric clip receiver system that is attached to an outrigger.

The improved electric clip receiver system for outriggers that is designed for water vessels, enhances the control and functionality of fishing lines during marine activities. The device includes an outrigger secured to the vessel, equipped with a mounting clamp and housing containing at least one electric stepper motor, stepper motor drivers, and a controller. At the housing's exterior, pulleys are connected to the motor drivers and integrated with line guides. Lines loop through midsection guides, far-end eyelets, and vessel-mounted rollers, forming closed circuit lines controlled by the motors. The system includes line clips at each end of the lines for securing fishing lines. The power source and control wire connect to the controller, enabling precise line adjustments. This innovative design enhances efficiency and ease of use, providing automated control for improved fishing performance and convenience in deploying and retrieving fishing lines.

A fishing line of a fishing pole attaches to the line clips of the outrigger.

An object of the present invention is to provide a device that will allow a fisherman to set multiple lines on an outrigger release clip using a minimal amount of manual force.

Another object of the present invention is to provide a device that will automatically move multiple outrigger release clips inward and outward from an outrigger.

Yet another object of the present invention is to provide a device that will speed the reloading of fishing lines on an outrigger release clip.

DRAWINGS

These and other features, aspects, and advantages of the present invention will become better understood with regards to the following description, appended claims, and drawings where:

DESCRIPTION

Figure 1:
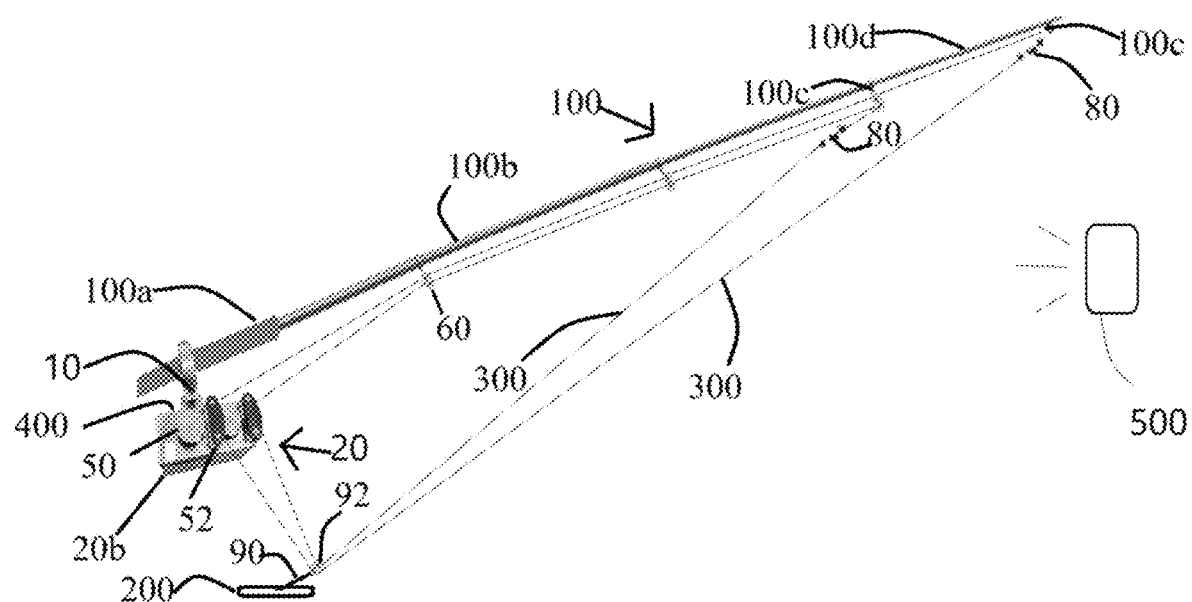
FIG. 1 is a side view of a first embodiment of the present invention.
Figure 2:
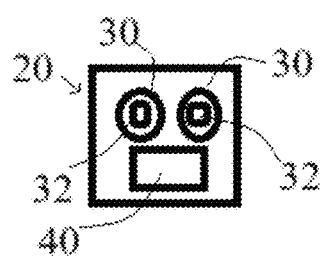
FIG. 2 is a schematic of the internal elements of the present invention.

Referring to FIGS. 1-2, the present invention is an improved electric clip receiver system for outriggers.

The improved electric clip receiver system comprises of an outrigger 100 that secures to a water vessel 200. A mounting clamp 10 that attaches to a handle 100a of the outrigger 100. A housing 20 that is attached to the mounting clamp 10 of the outrigger 100, the housing 20 houses at least one electric stepper motor 30, at least one stepper motor driver 32, and a controller 40. At least two pulleys 50 are connected to the at least one stepper motor driver 32 at an outer section of the housing 20b, and at least two line guides 52 that are adjacent to the at least two pulleys 50. At least two outrigger line guides 60 that are connected to a mid lower section 100b of the outrigger 100. At least two eyelets 100c on a far end section 100d of the outrigger 100. At least two lines 300 are connected to the at least two pulleys 50 and the at least two lines 300 loop around the at least two eyelets 100c. At least two line clips 80, the at least two line clips 80 connect to each end of the at least two lines 300. A vessel mount 90 that has at least two line rollers 92, the at least two lines 300 pass through the at least two rollers 92 and then pass through the at least two line guides 52 and then connect to the at least two pulleys 50, thereby forming at least two closed circuit lines. And, a DC power source and control wire 400 that operatively connects to the controller 40.

In an embodiment of the present invention, the controller 40 is a radio frequency controller that operatively connects to a radio frequency remote 500.

An advantage of the present invention is that it provides a device that allows a fisherman to set multiple fishing lines on an outrigger release clip using a minimal amount of manual force.

Another advantage of the present invention is that it provides a device that automatically moves multiple outrigger release clips inward and outward from an outrigger.

Yet another advantage of the present invention is that it provides a device that speeds the reloading of fishing lines on an outrigger release clip.

The embodiments of the improved electric clip receiver system for outriggers described herein are exemplary and numerous modifications, combinations, variations, and rearrangements can be readily envisioned to achieve an equivalent result, all of which are intended to be embraced within the scope of the appended claims. Further, nothing in the above-provided discussions of the improved electric clip receiver system for outriggers should be construed as limiting the invention to an embodiment or a combination of embodiments. The scope of the invention is defined by the description, drawings, and appended claims.

What is claimed is:

1. An improved electric clip receiver system for outriggers, the improved electric clip receiver system comprises:

an outrigger that secures to a water vessel;

a mounting clamp that attaches to a handle of the outrigger;

a housing that is attached to the mounting clamp of the outrigger, the housing houses at least one electric stepper motor, at least one stepper motor driver, and a controller;

at least two pulleys are connected to the at least one stepper motor driver at an outer section of the housing, and at least two line guides that are adjacent to the at least two pulleys;

at least two outrigger line guides that are connected to a mid lower section of the outrigger;

at least two eyelets on a far end section of the outrigger;

at least two lines are connected to the at least two pulleys and the at least two lines loop around the at least two eyelets;

at least two line clips, the at least two line clips connect to each end of the at least two lines;

a vessel mount that has at least two line rollers, the at least two lines pass through the at least two rollers and then pass through the at least two line guides and then connect to the at least two pulleys, thereby forming at least two closed circuit lines; and a DC power source and control wire that operatively connects to the controller.

2. The improved electric clip receiver system for outriggers of claim 1, wherein the controller is a radio frequency controller that operatively connects to a radio frequency remote.

* * * * *